United States Patent [19]

Schultz

[11] 4,198,180
[45] Apr. 15, 1980

[54] THRUST CONTROLLED DRILLING APPARATUS

[75] Inventor: Matti I. Schultz, Maryland Heights, Mo.

[73] Assignee: McDonnell Douglas Corporation, St. Louis, Mo.

[21] Appl. No.: 904,999

[22] Filed: May 11, 1978

[51] Int. Cl.² .............................................. B23B 39/00
[52] U.S. Cl. .......................................... 408/9; 408/10; 408/12
[58] Field of Search ......................... 408/9, 10, 11, 12; 318/689, 332

[56] References Cited

U.S. PATENT DOCUMENTS

| | | | |
|---|---|---|---|
| 2,547,079 | 3/1951 | Gerentes | 408/12 X |
| 3,051,023 | 8/1962 | Hirsch | 408/11 |
| 3,224,338 | 12/1965 | Reynolds | 318/332 X |
| 3,248,629 | 4/1966 | Reynolds | 318/332 X |
| 3,259,023 | 7/1966 | Rieger et al. | 408/11 X |
| 3,325,710 | 6/1967 | Reynolds | 318/332 X |
| 3,418,549 | 12/1968 | Emerson | 318/689 X |
| 3,526,158 | 9/1970 | Adams et al. | 408/9 X |
| 3,720,135 | 3/1973 | Merner et al. | 408/11 X |

FOREIGN PATENT DOCUMENTS

| | | | |
|---|---|---|---|
| 561361 | 9/1932 | Fed. Rep. of Germany | 408/11 |
| 2101704 | 8/1972 | Fed. Rep. of Germany | 408/11 |
| 280300 | 8/1968 | U.S.S.R. | 408/9 |
| 475253 | 4/1973 | U.S.S.R. | 408/9 |

Primary Examiner—William R. Briggs
Attorney, Agent, or Firm—Gravely, Lieder & Woodruff

[57] ABSTRACT

Drilling apparatus for driving a drill bit in one pass through several plies of material having different hardness characteristics, and in which the speed of rotation of the drill bit is selected automatically by the thrust resistance encountered by the drill bit. The automatic selection of drill bit speed is accomplished by a feed back system responsive to drill bit thrust for changing the governor control on the drive motor, whereby the increase in thrust effects drill bit speed reduction and a decrease in thrust effects an increase in drill bit speed.

8 Claims, 4 Drawing Figures

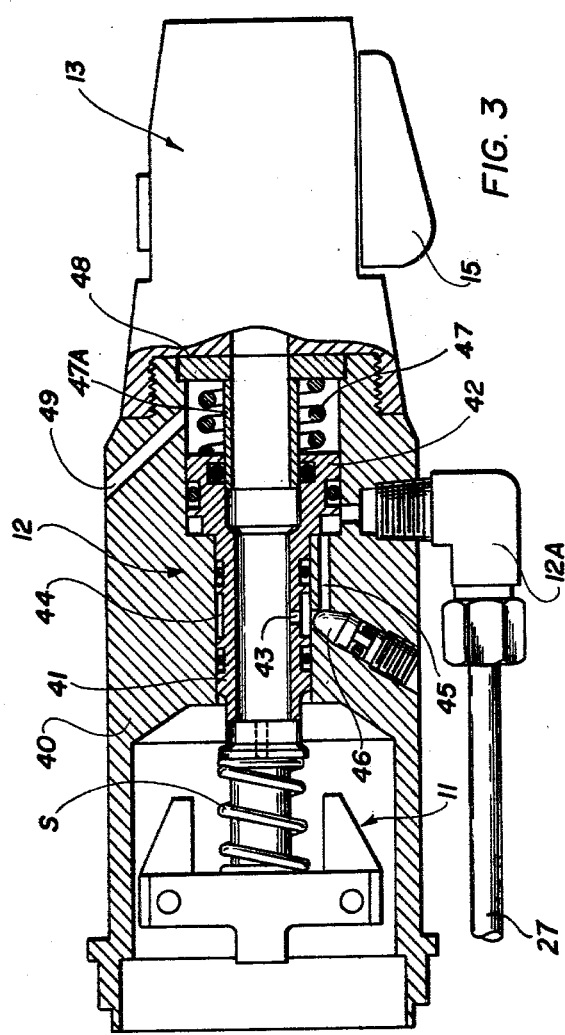
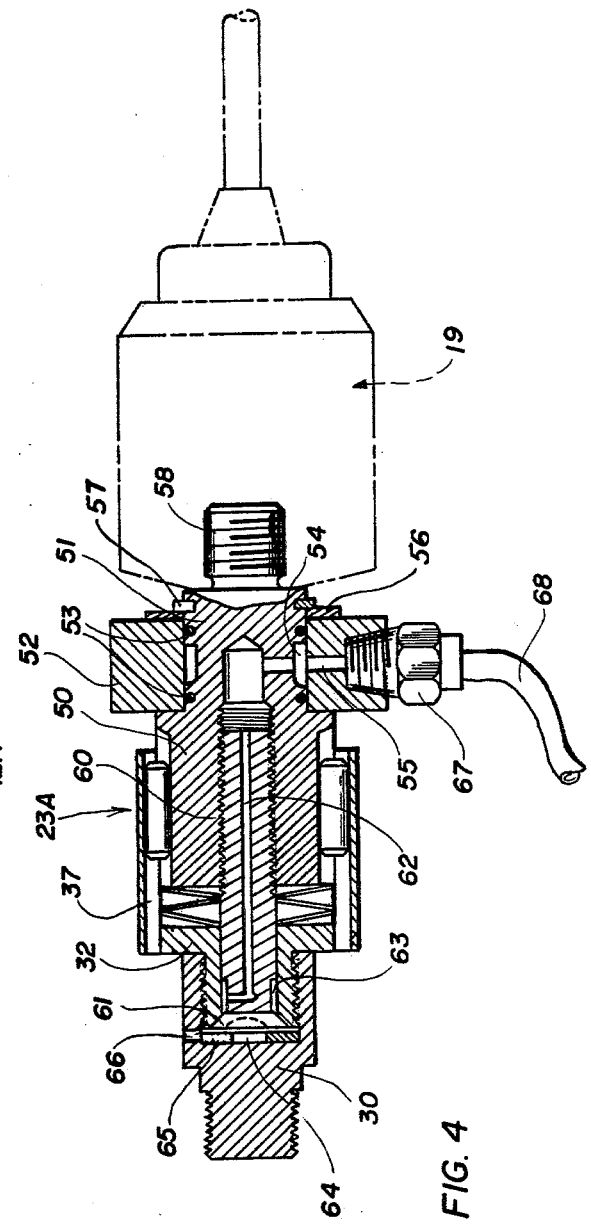

THRUST CONTROLLED DRILLING APPARATUS

BACKGROUND OF THE INVENTION

It is recognized that drilling dissimilar materials calls for speeds and feeds appropriate for each of the particular material. For instance, it is known that all materials when drilled with a given feed rate, such as inches per revolution, generate certain amount of thrust, which is resistance to drill penetration. The thrust, or resistance, is normally higher as the hardness of the material increases, and hard materials also require a slower speed or rotation (RPM). The correlation of that is as the material gets softer the thrust decreases and the rotation can increase. When drilling titanium the thrust is quite high and the drill rotation is low, but when drilling aluminum the thrust is low and the drill rotation is high. There are a number of non-metallic materials which are frequently used in the production of products, whether in the aircraft field or in other fields. These materials are graphite or epoxy which are in the class of soft materials which can be drilled at higher speeds than steel or titanium and materials of that class of hardness.

When drilling one type of material, the drill thrust or feed and speed can be preset at the start and maintained substantially unchanged throughout the depth of drill. However, it frequently happens that dissimilar materials need to be assembled and drilled for the insertion of securing means to hold the material. The drill therefore needs to be capable of changes in speeds, and frequently the speed is set for the material that calls for the lowest speed. This is inefficient and hard on the drill bit.

An early appreciation of the speed and feed problem encountered in drilling materials varying in hardness is found in Gerentes U.S. Pat. No. 2,547,079 issued Apr. 3, 1951 which related to an electric drill used in mines and quarries. In this machine, the object is to depend upon two independent motor driven mechanism, one for the feed movement and the other for the rotation of the drill bit. Somewhat the same idea may be found in Adams et al U.S. Pat. No. 3,526,158 issued Sept. 1, 1970 wherein two motors are incorporated to drive a drill and countersink, and a mechanical feeler is used to sense the drill break-through penetration of a workpiece and to shift to the slower speed motor to drive the countersink. Other prior examples are described by Reynolds in U.S. Pat. No. 3,224,338 issued Dec. 21, 1965; in U.S. Pat. No. 3,325,710 issued June 13, 1967; and in U.S. Pat. No. 3,248,629 issued Apr. 26, 1966; each of which is concerned with speed control of an electric drive motor for a cutting tool so that the work factor remains substantially constant while speed and torque vary inversely. However, these prior art examples of the work of Reynolds are not concerned with the sequential drilling of dissimilar materials in one drill pass.

The conventional machine practice places the speed and feed selection in the judgment of the operator as to what he thinks the material requires. While the concepts disclosed by Gerentes or Adams et al might be thought of as replacing the experience of the operator, neither has proved practical in the light of current needs. However, the work of Emerson et al as disclosed in U.S. Pat. No. 3,418,549 which issued Dec. 24, 1968 took into account the speed and feed variations when sequentially drilling materials of different hardness characteristics. This feature took the form of control of the cutter machine slide feed rate by utilizing a voltage proportional to the spindle motor torque to adjust a manual speed rate override in accordance with variations in the load sensed by the cutter. This is attained by establishing certain predetermined spindle motor speed-torque droop characteristics sufficient to meet the torque required by the cutter for each particular material. In short, this patent is directed to a machine operation combining numerical and torque control systems in which a punched tape is used in conjunction with manual feed rate control which supplies a variable voltage to a clock to vary the frequency of its variable oscillator. The system requires an interpolator which translates data from the clock and from the tape into velocity and position directions for each of the X, Y and Z axes of the machine.

BRIEF SUMMARY OF THE INVENTION

The present invention relates to the improvement of drilling dissimilar materials in a sequential drilling operation by a thrust sensor and a feed back connection to a variable speed motor.

When drilling dissimilar materials in a single pass, such as plies of titanium and aluminum, or plies of titanium, graphite and epoxy, or any sequence of plies of dissimilar materials which vary in hardness, the optimum drilling speed for each material should be used. The existing drilling methods and equipment fail in this respect because they are concerned primarily with speed selection in accordance with the material that requires the slowest speed or RPM, or with torque reaction of the drive motor.

A principal object of the present invention is to employ a thrust sensor associated with the drill and connected to control the speed of the drill driving motor, whereby the sensor will respond directly to differences in drilling thrust variations imposed by the various materials and will generate a signal for changing motor speed automatically to that which is suitable based on thrust response.

It is also an object of the present invention to embody a thrust sensor in a drill spindle drive line to act as a signal generator to activate a servo mechanism which, in turn, will effect an automatic speed (RPM) change, whereby as the drill moves from a material of a first hardness to a material of a second hardness the drill speed automatically changes to the optimum for the material having the second hardness, the first and second hardness materials being different.

The present invention may be embodied in a stationary material drilling apparatus, but its desired commercial form is in a hand-held drill which can be moved to the work to be drilled or which can be used with templates having non-uniform hole patterns. Other uses are, of course, possible.

BRIEF DESCRIPTION OF THE DRAWINGS

The present invention is presented in certain preferred embodiments which have been set forth in the accompanying drawings, wherein:

FIG. 3 is a detailed sectional view of an enlarged scale of a servo-valve unit associated with the drive motor governor of the apparatus seen in FIG. 1; and FIG. 4 is a detailed sectional view on an enlarged scale of a modified thrust sensor to be connected to the servo-valve unit.

DETAILED DESCRIPTION OF THE EMBODIMENTS

The general arrangement of the present apparatus is to provide a drive motor with a gear connection to the drive spindle for the drill chuck and a speed or RPM governor which can be adjusted for a desired speed range. The drive spindle is mounted in a housing so it may freely rotate and drive not only the drill chuck, but a thrust sensor mounted adjacent the chuck. The thrust sensor and governor are interconnected, either directly or indirectly, through a servo-valve unit which is associated with the governor. The operative interconnection may be a suitable air pressure line in which the servo for the governor changes the governor speed in response to the escape of the air permitted at the sensor but regulated by a needle valve.

For example, a Quackenbush Drill Motor QDA 11 may be modified by providing the governor servo-valve unit with an adjustable needle valve for control over the governor speed, by inserting a thrust sensor behind the drill chuck in the chuck driving line, and by interconnecting the outlet of the servo-valve unit with the thrust sensor so that the sensor can either load or unload the governor in response to the actual thrust developed by the drill during its penetration into the work. It is understood that the thrust is normally higher for the hard materials than it is for the softer materials, and the RPM is lower.

Figure 1:
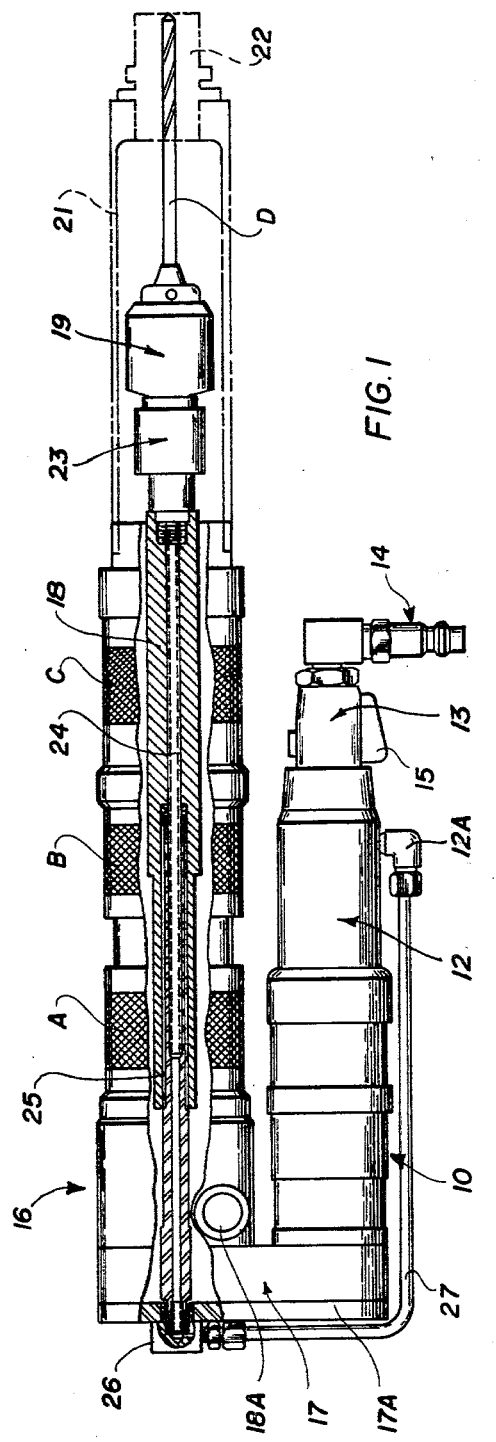
FIG. 1 is an assembly view of one embodiment of a thrust controlled drill apparatus with portions of the housing broken away to reveal certain components in fragmentary section.

FIGS. 1 and 3 illustrate, for convenience of this disclosure, a Quackenbush QDA 11 Drill having the arrangement of the housing 10 which contains the usual air motor (not shown) and motor governor seen in part at 11. The governor 11 is controlled by a servo-valve unit 12 in series connection between the governor 11 and an air supply valve 13 having an air supply fitting 14 and the usual on-off manual control 15. The housing 10 is mounted alongside of and parallel with a housing 16, and these two housings are interconnected by a housing 17 which contains the usual drive mechanism (not shown) for the purpose of reducing the air motor speed to a value that can be useful in rotating the spindle 18 in the drive line for the drill chuck 19. The drive mechanism in housing 17, and enclosed by a removable cover 17A includes a gear assembly driven by a motor in housing 10 which transmits that drive to the spindle 18 during a drilling operation. Part of the drive gear assembly is disposed in the side boss 18A and includes a worm wheel and a helical gear (not shown). The housing 16 is provided with a collar A which rotates to adjust the retracted position of the spindle 18; a collar B which is rotated to start forward advance of the spindle 18 and to manually retract the spindle 18; and a collar C which is turned to limit the feeding motion of the spindle 18 and to automatically retract the spindle 18. The outer end of the housing 16 is provided with an opensided extension 21 which exposes the chuck 19 and allows the mounting and dismounting of the drill bit D. A drill bit guide 22 is carried at the outer end of the extension 21.

The thrust sensor 23 of this invention is threadedly mounted in the end socket 23A of the spindle 18 and, in turn, supports the chuck 19. The sensor 23 is operatively connected with the servo-valve unit 12 indirectly by an air passage in a telescoping tube 24 which slides in a spline tube 25. The tube 25 is rotatably connected into a rotary seal block 26 and an external air line 27 extends to a connection at fitting 12A with the servo-valve unit 12.

Figure 2:
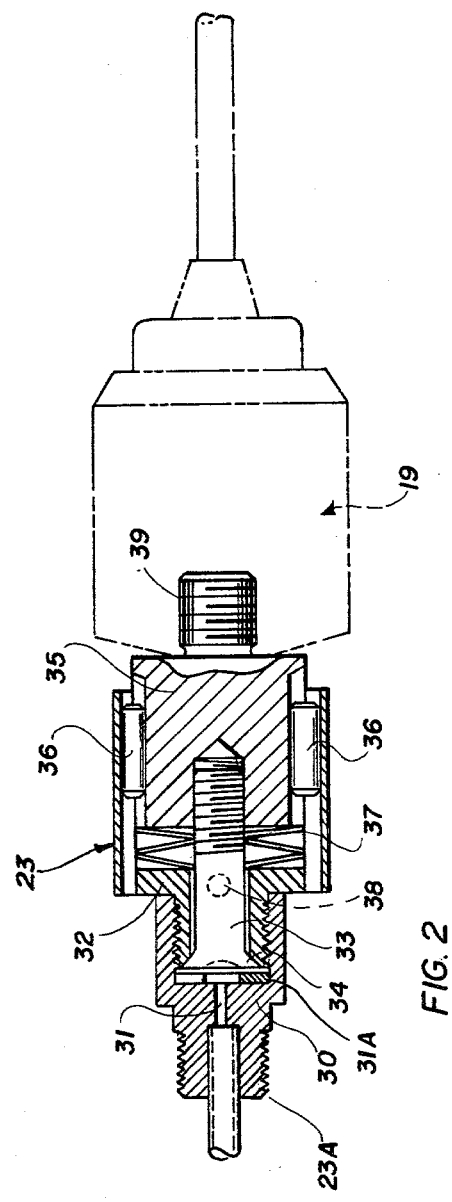
FIG. 2 is a detailed sectional view on an enlarged scale of a thrust sensor assembly associated with the drill chuck as seen in FIG. 1.

FIG. 2 is an enlarged sectional view of the thrust sensor unit 23. This unit comprises an adapter body 30 which is axially drilled to form a passage 31 which receives one end, in a press fit, of the air tube 24. The body is enlarged axially beyond the passage 31 by a counterbore to receive a valve seat thimble 32 which surrounds the valve element 33 and forms the seat for the valve head 34. The stem of the valve element 33 is adjustably connected to a thrust block 35 which telescopes in the adapter body 30 on pins 36 which engage in registered grooves in the body 30 and block 35. Thus, the pins 36 are captured in the grooves and form the drive means for imparting rotation from the spindle 18 to the block 35. The block 35 is yieldably spaced from the thimble 32 by resilient means 37 which may be a cluster of several Belleville washers. The resilient means 37 normally draws the valve head 34 into a position where it is seated on the thimble 32 so that there is no air flow past the valve element 33 to a vent aperture 38 to atmosphere. The block 35 is formed with a threaded extension 39 which connects into the chuck 19. Thus, the thrust resistance in hard material encountered by the drill D will cause the block 35 to move to compress resilient means 37 and lift the valve head 34 off its seat on the thimble 32 by an amount sufficient to allow air flow to vent 38.

FIG. 3 is an enlargement of the servo-valve unit 12 associated with the governor 11. As seen the body 40 is formed with internal axial bores of different diameters so that the body of a servo piston 41 may slide in the reduced diameter bore while its enlarged piston head 42 moves in the larger diameter bore and may abut the shoulder between the bores. The piston 41 is a tubular body so air may flow through it to the motor operatively mounted in the housing 10 beyond the governor. An orifice 43 in the side of the piston 41 opens to an annular external recess 44, and that recess communicates with a longitudinal passage 45 controlled by the needle valve 46. The passage 45 leads to the fitting 12A which connects to the air line 27 that in turn, connects into the rotary seal block 26. The head 42 of the piston 41 is normally held against the shoulder between the bores in the body 40 by resilient means 47 which surrounds a guide tube 47A formed with a flange 48 press fitted into its seat in body 40. The hollow tube is open to the air passage from the air supply valve 13 threaded onto the body 40. The chamber in which the resilient means 47 is disposed is vented to atmosphere by a vent passage 49, whereby the pressure of the air under the head 42 is effective to slide the head 42 on the guide 47A to compress the resilient means 47 when the valve 33 in sensor 23 is closed.

It is now understood that air under pressure admitted at fitting 14 and permitted past valve 15 flows through the axial bore in the guide 47A and servo piston 41 to the air motor in housing 10. Adjusting the needle valve 46 will control the rate of flow of air to the line 27 and into the longitudinal bore or passage leading from the rotary seal block 26 to the valve head 34 at the thrust sensor. The flow of air is cut off at the head 34 because the resilient means 37 moves the block in a direction to close the head against the thimble 32. When the air flow is cut off the pressure acts on the servo-piston head 42 to compress the resilient means 47. The motion of piston 41 changes the governor setting to increase the speed of the motor by reducing the tension on the governor spring S. Now, if the valve head 34 in the thrust sensor 23 moves off its seat air flow will take place through the vent aperture 38 and that will reduce the air pressure on piston head 42 resisting the resilient means 47 in the servo-valve unit 12 with the result that the servo piston 41 will be forced toward the governor 11 to increase the load on the governor spring S which will reduce the air motor speed.

What has been described is a thrust sensitive control on the drill motor governor by way of a pressure feedback from the thrust sensor 23 to the governor servo-valve unit 12. In that feed-back system, an adjustable needle valve 46 is disposed at a place where the initial speed of the drill motor can be preselected by reason of the control of the position of the servo-piston 41 engaged on the governor spring S.

In FIG. 4 the thrust sensor is shown in a modified form 23A, although it functions in cooperation with the servo-valve unit 12 as above described. The modification comprises the manner in which the air flow connection is made with the unit 12. The block 50 is provided with an extension 51 that forms a cylindrical seat for a swivel body 52 that fits on that seat. The body 51 carries suitable seals 53 on each side of an annular recess 54 that opens to an air inlet passage 55. A suitable retainer washer 56, and clip 57 for the washer are disposed on the extension 51 to hold the swivel body 52 in position. The extension 51 is provided with an extension 58 to support the drill chuck 19 as previously noted.

The modified block 50 is axially movable in the body 30 toward and away from the valve seat thimble 32, and its motion is resisted by a cluster of Belleville washers 37 or other resilient means. The block 50 carries a valve element 60 which is formed with a head 61 adapted to seat on the adjacent end of the thimble 32. The valve element 60 is formed with an axial passage 62 in communication at one end with the recess 54, and at the other end with an annular recess 63 at the valve head 61. When the valve head 61 is moved off of the thimble seat it opens the recess 63 to a vent gap 64 in a C-washer 65 in the body 30 which forms an opening to vent 66.

The modified thrust sensor 23A, of course, must rotate, but the swivel body 52 must remain in position in the protective housing extension 21 so that the air conduit fitting 67 can be attached to deliver a flow of air from the conduit 68. It can be appreciated that the end of the conduit 68 (not shown) can be attached to the servo-valve unit 12 at the fitting 12A. This is an inexpensive short-cut to avoid the previous air flow connection through line 27, seal block 26, the telescoping air tube 24 internally of the housing 16. The modified sensor 23A cooperates with the servo-valve unit 12 as before set forth in the description of FIGS. 1, 2 and 3.

The operation of either embodiment of the thrust sensor 23 or 23A is intended to normally allow the air motor in housing 16 to run at its higher rated speed so that on governor adjustment by the servo-valve unit 12 the motor can be slowed down to its lower rated speed. Furthermore, for the particular make of drill apparatus noted above, the drive mechanism in housing 16 is designed to effect a spindle feed of from 0.0005 inches to as much as 0.016 inches. These last feeds are just examples of some possible ranges of feed.

The housing 16 includes several external control collars, A, B and C that upon selective rotation effect certain operating functions. These functions as described above are well understood and do not form a part of the invention. The essential features of the invention are found in the provision of the thrust sensor 23 or 23A in association with the chuck 19 for the drill bit, the servo-valve unit 12 in association with the motor speed governor, the feed-back connection between the sensor and the servo-valve unit, the resilient means in each of the latter components, and the presence of an adjustable needle valve 46 in that feed-back connection to provide for a desired time in the feed-back signal when the drill bit thrust build-up requires a change in the drill bit speed.

What has been described above is the unique structure which responds to the thrust resistance encountered by a drill as it encounters material of different hardness. The sensor 23 or modified sensor 23A are initially adjusted so the resilient means 37 can hold the valve means closed for drilling relatively soft materials like aluminum, graphite, epoxy and the like. The valve closed position causes air pressure to move the servo-piston to reduce the governor spring tension for increasing drill speed. When a hard material like steel, titanium or the like, is encountered by the drill, the resilient means 37 will yield and allow the valve to open. This response causes air to flow which reduces pressure on the servo-piston 41 and the resilient means 47 moves the servo-piston to increase the governor spring tension which slows the drill speed. This unique structure allows proper drill speeds when drilling through materials of different hardness in a single drill pass. It is the valve in the sensor 23 or 23A that responds to drill thrust which feeds a signal to the governor to change speed. In one drill pass the drill speed might change several times.

The foregoing description has been set forth in relation to a Quackenbush drill apparatus as that make has been used in arriving at the unique apparatus for automatically regulating the drill speed (RPM) on the basis of the character of hardness of the material being drilled by the drill bit. The principle of the present invention is, of course, capable of being adapted to other makes of drill apparatus, and therefore limitations are not to be imposed unnecessarily.

I claim:

1. In thrust controlled drilling apparatus for moving a drill through an assembly of materials having different hardness characteristics, the combination of a spindle, motor means, drive means operatively interconnecting said spindle and motor means for simultaneously rotating and longitudinally feeding said spindle toward the material assembly, a drill supporting chuck, drill thrust sensor means interconnecting said chuck and spindle, governor means for said motor means, governor speed control means operatively connected to said governor means, a conduit for air under pressure operatively interconnecting said drill thrust sensor means and governor speed control means, and thrust sensor means having a vent openable to atmosphere to reduce the air pressure by venting it to atmosphere and thereby effecting a change in the speed of said motor means with changes in the hardness characteristics of the material in the assembly.

2. In thrust controlled drilling apparatus for moving a drill through an assembly of materials having different hardness characteristics, the combination of a spindle, motor means, drive means operatively interconnecting said spindle and motor means for simultaneously rotating and longitudinally feeding said spindle toward the material assembly, a drill supporting chuck, drill thrust sensor means interconnecting said chuck and spindle, governor means for said motor means, governor speed control means operatively connected to said governor means, said governor speed control means having a governor adjusting element, resilient means acting on said element to adjust the governor for lower speed, a source of air under pressure acting on said adjusting element in a direction opposing said resilient means and normally adjusting the governor for higher speed, said drill thrust sensor means including a body having a passage open to atmosphere, a valve element operatively movable in said passage to open said passage, resilient means in said body normally moving said valve element to close said passage, and an air flow connection between said governor adjusting element and said passage, said air flow connection permitting escape of air to atmosphere at said valve element and a consequent adjusting of said governor to lower speed.

3. In thrust controlled work-piece drilling apparatus, the combination of a drill receiving chuck, motor operated means operatively connected to said chuck for rotating and simultaneously longitudinally feeding said chuck toward a work piece for effecting the formation of a hole in the work piece, governor means operatively connected to said motor means for regulating the speed of rotation of said motor means, a source of motive power for said motor operated means, and control means in said combination including a servo control operative on said governor means to affect its speed regulation, thrust sensor means adjacent said chuck, said thrust sensor comprises a body carried by said motor operated means, a thrust block carried by said chuck and movable relative to said body, a valve element carried by one of said body and block for movement to open a normally closed passage to atmosphere for releasing a portion of the motive power to atmosphere whereby said servo control effects a change in the governor speed regulation, means interconnecting said servo control and said thrust sensor through said source of motive power for said motor operated means, and adjustable means in said interconnecting means to vary the motive power flow rate therein.

4. In thrust controlled drilling apparatus for moving a drill through an assembly of materials having different hardness characteristics, the combination of an air operated drill motor; spindle means operatively connected to said drill motor for movement longitudinally and in rotation; chuck means for receiving a drill bit; drill bit thrust sensor means operatively connecting said chuck means to said spindle means, said thrust sensor means having an air flow passage open to atmosphere, a valve controlling said airflow passage, and resilient means engaged with said valve to resiliently urge it in a direction normally closing said passage; governor means for adjusting the speed of said drill motor; means to supply air under pressure to said drill motor; a governor servo-valve unit in said air supply means in position to control said governor means for adjusting the speed of said drill motor, said servo-valve unit having a movable element, resilient means urging said movable element in a direction to adjust said governor means for reducing the speed of said drill motor, passage means in said servo-valve unit to direct the air supply for moving said movable element in opposition to said resilient means for increasing the speed of said drill motor; and an air flow connection between said passage means in said servo-valve unit and said thrust sensor means at said air flow passage, air flow in said air flow connection being arrested by closure of said sensor means valve for effecting adjustment of said governor means to apply the air pressure on said servo valve movable element to increase the drill motor speed.

5. The thrust controlled drilling apparatus of claim 4 wherein said air flow connection between said passage means in said servo-valve unit and said thrust sensor means includes a passage through said spindle means to said thrust sensor means, a rotary seal for said spindle passage, and conduit means connecting said rotary seal passage and said servo-valve unit.

6. The thrust controlled drilling apparatus of claim 4 wherein said servo-valve unit includes an adjustable restriction element in said passage means.

7. The thrust controlled drilling apparatus of claim 4 wherein said thrust sensor means includes a body having a bore, a block slidably received in said bore, resilient means between said body and block acting to push said block out of said bore, said valve means being connected into said block and positioned to retain said block in said bore, and torque elements interconnecting said body and block to transmit rotation of said spindle through said body to said block.

8. In a thrust controlled drilling apparatus the combination of a cutter mounting chuck, a chuck driving motor, a governor operatively connected to said driving motor for regulating the speed of said motor, servo means adjacent said governor for changing the governor setting on said motor; said servo means having a movable element and resilient means urging said movable element in a direction to change said governor setting for reducing the motor speed, a motor driven connection with said chuck including a sensor device operative on cutter engagement with a workpiece to respond to the level of thrust of the cutter, and signal transmission means interconnecting said sensor device and said servo means to regulate the speed of said motor by setting said governor in accordance with the sensor device response to cutter thrust, said signal transmission means opposes the urging of said resilient means for normally setting said governor for increasing the motor speed.

* * * * *